July 10, 1956     I. EYRAUD ET AL     2,754,109
INSTRUMENT FOR RECORDING WEIGHTS AND MODIFICATIONS IN WEIGHT
Filed Nov. 4, 1952
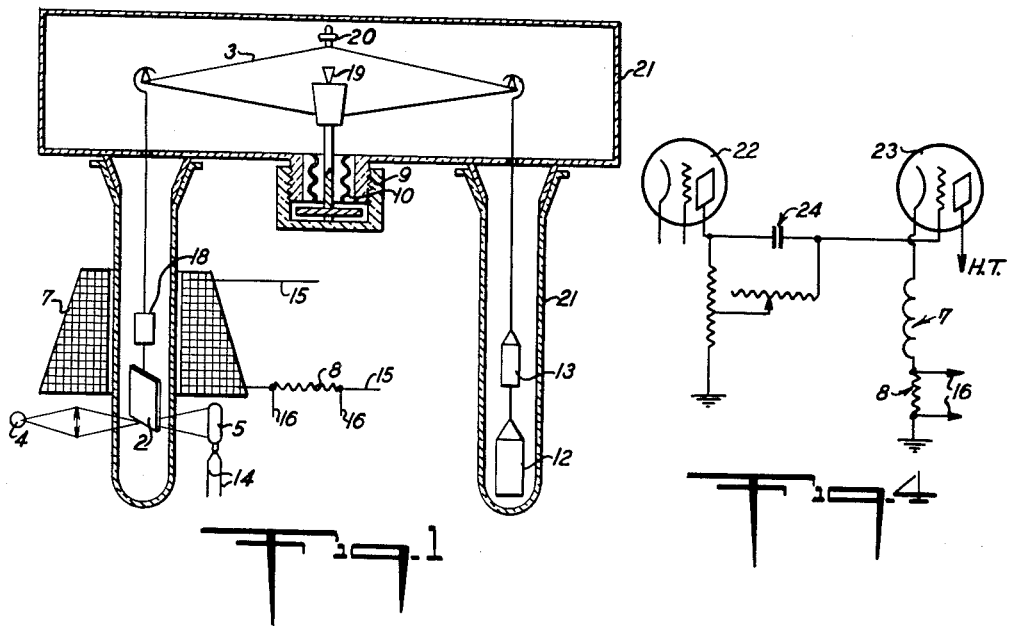
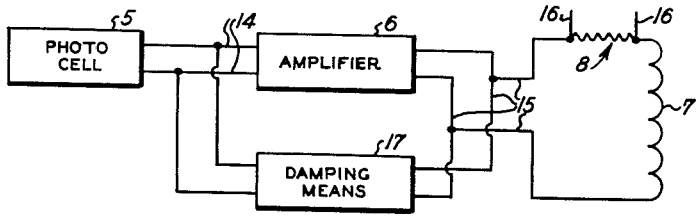
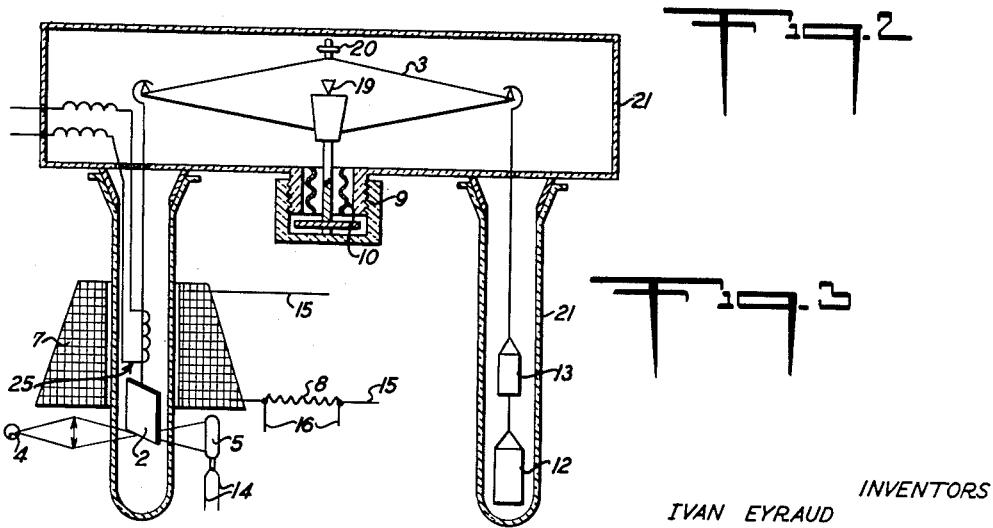
INVENTORS
IVAN EYRAUD
CHARLES EYRAUD
BY
*Haseltine Lake & Co.,*
AGENTS United States Patent Office 2,754,109
Patented July 10, 1956

2,754,109

INSTRUMENT FOR RECORDING WEIGHTS AND MODIFICATIONS IN WEIGHT

Ivan Eyraud and Charles Eyraud, Lyon, France

Application November 4, 1952, Serial No. 318,660

Claims priority, application France November 5, 1951

7 Claims. (Cl. 265—70)

As well known, the gravimetric method is generally the most convenient and the most accurate for defining the modifications of a substance or of a system adapted to undergo a chemical reaction when submitted to any treatment, such as heating, cooling, the action of a gas, of vacuum, of light or the like.

The usual analytical scales used in laboratories do not allow following, otherwise than in an intermittent manner and with frequent interruptions in the treatment, the modifications in weight, which modifications are a function of any parameter such as time, temperature, pressure, concentration of a gas or the like.

For this reason, a number of inventors have attempted to produce recording scales adapted to cut out any transfer of the sample carried thereby and any stopping in the treatment that is being applied to said sample. Most of the improvements obtained in this direction are based chiefly on measures of deflection.

In a first type of instruments, the moment of the weight of a sample with reference to a horizontal axis is balanced by a return torque the intensity of which is proportional to an angular shifting. This return torque is produced either by a torsion wire or by a shifting of the center of gravity of a beam round a horizontal pivot.

In a second type of instruments, the weight is balanced by a vertical force which is a function of the shifting of the point of application of the weight; such is the case of flexion scales, micrometric absorption scales incorporating a helical spring or electronic scales.

However, it has already been proposed to provide for automatic weighing by resorting to the so-called constant deflection or zero method. If equilibrium is obtained electromagnetically, the intensity of the current flowing through the magnetic coil is permanently adjusted to a value such that the weighing beam is returned to a predetermined position. This adjustment may be performed by hand or automatically through the operation of auxiliary control means actuated through the agency of photo-cells.

Our present invention has for its object the execution of a new recording instrument operating through the automatic magnetic compensation of the weights or variations in weight adapted to operate as desired under atmospheric pressure, in a partial or high vacuum or again in a conditioned atmosphere.

The above referred-to problem has been solved through the zero method or else, through the inclination method. The drawback of the last mentioned method consists in that the relative position of the coils acting on each other or that of a coil with reference to a co-operating magnet are caused to vary. The magnetic force is then a function of the current intensity passing through the coils and of the relative position of the latter. This leads to serious objections as concerns the stability of the gauging of the instrument and this inadequateness has never been removed hitherto. However, this method is of practical importance by reason of the great simplicity it allows for its electronic section.

In the zero method, in contradistinction, the relative position of the magnetic cooperating parts is constant and the attractive force depends solely on the intensity of the current flowing through the coil, which makes the gauging invariable with time. Unfortunately, the auxiliary means providing for equilibrium are of necessity very complex and expensive and their adjustment is highly intricate.

Now, our inventon has a threefold advantage: it benefits by the simplicity of execution provided by the so-called inclination method as compared with the zero method; it leads to the production of an instrument the indications of which are not influenced by the modifications in the characteristics of the electronic section of the system such as modifications in the sensitivity of the scale, modifications in the electron-emitting capacity of the tube cathodes, etc. These modifications in the characteristic features of electronic circuits are, as a matter of fact, considerable during operations which may last several dozen hours; hitherto, no designer of electronic balances operating in accordance with the inclination method had solved the problem arising therefrom, and the gauging of such balances varied always during the course of a somewhat lengthy operation; it cuts out the necessity of resorting to a careful stabilization of the voltage fed from the mains, such a stabilization being expensive and requiring a delicate adjustment.

To this purpose and according to our invention, the weights or modifications in weight are translated into electromotive forces or variations of an electromotive force through the association of the following means: a magnetic equilibrating coil fed by the amplified current from a photo-cell exposed to a luminous beam that is cut off by an adjustable screen suspended to one end of the balance beam; an iron core devoid of hysteresis also suspended to the beam of the scales and adapted to move along the axis of the above-mentioned balancing coil, said core submitted to a constant voltage being replaced, if desired, by a solenoid; means such that the value of the magnetic attraction may depend solely on the intensity of the electric current passing through said equilibrating coil and no longer on the angular setting of the beam; means providing for the indifferent equilibrium of the scale, the center of gravity of the movable system lying on the axis of the beam; and means for ascertaining the modifications in weight as provided by recording said current at the output of the equilibrating coil.

We have illustrated by way of example in accompanying diagrammatic drawings two embodiments of our improved scales. In said drawings:

Fig. 1 is a diagrammatic front elevational view of our improved scales.

Fig. 2 is an electronic wiring diagram of said scales.

Fig. 3 illustrates a modification of the arrangement shown in Fig. 1.

Fig. 4 shows a damping diagram for the scales.

As shown in Figs. 1 and 2, a screen 2 suspended to one of the ends of the beam 3 of the scales controls the luminous beam passing out of the source of light 4 and impinging on the photo-cell 5. The cell output current is amplified by an electronic arrangement 6 (Fig. 2) and is then sent into a magnetic equilibrating coil 7.

The beam 3 is similar to that of conventional high accuracy scales and is housed inside a chamber 21. The release of the beam and of the clips thereof is controlled by a helical sloping member 9 while fluid tightness is obtained for the releasing means by a metal wall 10 folded accordionwise; the sample of which it is desired to follow the modifications in weight is shown at 12 while a tare 13 is suspended together with said sample to the end of the beam 3 opposed to that carrying the screen 2. 14 designates the leads connecting the cell 5 with the amplifier 6 (Fig. 2) while 15 designates further leads connected with the output of the amplifier and with the input of the equilibrating coil 7 referred to hereinabove. Reference number 16 designates the leads connecting the terminals of the resistance 8 with the recording means that are not illustrated. Damping means 17 are inserted shuntwise with reference to the amplifier means 6 as shown in Fig. 2.

It should also be remarked that the amplifying and damping circuits may be combined into one or that the damping circuits may be controlled by a further cell or cells.

If the beam 3 of the scales is used under normal operative conditions i. e. if it is adjusted in a manner such that the center of gravity of the loaded pivoting system of the scales lies underneath the pivotal axis, it is easy to understand that any modification in the voltage of the feeding means, in the amplifying power of the electronic section of the instrument in the sensitivity of the photo-cell or in the luminous intensity of the illuminating means will produce a modification in the intensity of the current feeding the equilibrating coil, which latter modification does not correspond to any modification in the weight of the sample. As a matter of fact, in the case of any variations in the sensitivity of the photo-cell 5 or of the amplifying power, the intensity of the current passing through the coil 7 would immediately vary and consequently the beam 3 would have a tendency to assume a different position of stable equilibrium. In this new position of equilibrium, the magnetic force exerted on the beam 3 would be different so as to compensate for the variations in the moment of the center of gravity with reference to the axis of the pivotal system. Therefore, generally speaking, the intensity corresponding to a novel position of equilibrium and also the electromotive force applied to the recording means would be no longer the same as precedingly. The case would be the same if the intensity of the luminous source were to vary.

To make the operation of our balance easier to understand, we may rely on the equation giving out the conditions of equilibrium of the beam:

$$F_p \cdot L \cos \alpha + M_g = F_m \cdot L \cos \alpha \quad (1)$$

wherein:

$F_p$ is the weight of the sample;
$M_g$ is the moment of the center of gravity with reference to the axis of rotation of the beam;
$F_m$ the magnetic force acting on the iron core;
$L$ the length of the beam arms;
$\alpha$ the inclination of the beam with reference to horizontality.

We will suppose $F_p$ is constant, i. e. the weight to be measured does not vary. On the other hand, $M_g$ is a function of the inclination $\alpha$ of the beam $M_g = f(\alpha)$;

$F_m$ is a function of the intensity flowing through the coil, on one hand and, on the other hand, of the relative location of the coil and of the iron core, i. e. of the inclination $\alpha$ of the beam: $F_m = g(\alpha, i)$.

Any modification of an electrical magnitude such as the sensitivity of the cell, the amplification factor, the intensity of the luminous source etc., produces a modification in the inclination of the beam and a variation of the intensity in the coil. This may be shown by the equation giving out the constancy of the weight of the sample as expressed by $$F_m = \frac{M_g}{L \cos \alpha}$$

This leads to the following equation:

$$g(\alpha_1, i_1) - \frac{f(\alpha_1)}{L \cos \alpha_1} = g(\alpha_2, i_1) - \frac{f(\alpha_2)}{L \cos \alpha_2} \quad (2)$$

which means that, for different values of the inclination $\alpha$, and for the same weight $F_p$, the intensity cannot retain the same value. In none of the balances proposed hitherto and operating in accordance with the inclination method, has this variation in intensity been automatically compensated.

Now the two chief features of our improved recording scales are as follows:

(a) the center of gravity of the movable parts including the beam 3, the sample 12, the tare 13, the screen 2 and the iron core 18, is located on the edge of the central knife 19 of the pivoting beam 3. In other words, the movable system is adjusted to assume an indifferent equilibrium whenever no magnetic force is applied to it.

(b) for a constant intensity of the current passing through the coil 7, the magnetic force does not depend on the inclination of the beam 3.

Thus, the above Equation 2 becomes simply $$F_p = F_m$$

while $$F_m = g(i)$$

The first condition is satisfied through a suitable adjustment of the small weight 20 carried by the beam.

In order to satisfy the second condition, it is necessary for the magnetic force to be independent of the actual location of the iron core 18 when the intensity of the current flowing through the coil is constant. To this end, and in accordance with Fig. 1, the outline of the coil 7 is such that the width of the coil decreases from bottom to top, said outline of the coil assuming a predetermined substantially frustoconical shape whereby the said second condition is satisfied within a very large range. In practice, the movements of the beam 3 are always very small to either side of a mean position and it is sufficient for said condition to be satisfied within a small area with an allowance of infinitely small values of the second magnitude. It is consequently sufficient according to a modification of our invention that requires no special coiling for the iron core 18 to occupy a location corresponding to a maximum or to a minimum of the value of the magnetic attractive force, the shape of the coil in this latter case being indifferent.

If it is assumed that the weight of the sample is defined by the intensity of the current passing through the coil 7, there will correspond to each weight of the sample a drop in voltage across the terminals of the resistance 8 in series with said coil 7.

It is thus easy to understand that, the two above conditions being satisfied, the indications of weight will be independent of the modifications of the electrical parameters of the instrument such as the sensitivity of the photo-cell 5, the intensity of the luminous source 4, the amplifying power of the electronic means 6 and the voltage of the feeding mains. As a matter of fact, a modification of one of said parameters corresponds to an automatic displacement of the screen 2 such that the magnetic force and the intensity of the current in the coil 7 remain constant as also the indication of weight. The above referred-to equation $$F_m = g(i_1) = g(i_2)$$

leads to the conclusion: $i_1 = i_2$.

This self-stabilizing arrangement, which operates perfectly when the parameters referred to vary in a progressive manner has a response that is not speedy enough in the case of sudden modifications in the voltage of the feeding mains. The reason thereof lies in the fact that the inertia of the beam does not allow any instantaneous shifting of the screen 2. When the mains are submitted to disturbances that are too sudden, it is therefore of interest to feed the electronic section of the instrument and the source of light through the agency of saturated iron transformers.

Our invention is obviously not limited to the single embodiment that has been described hereinabove. Certain changes may be brought thereto without modifying the principle underlying our novel continuously recording scales adapted to operate inside a closed chamber.

Thus it is possible to substitute for the iron core 18 devoid of hysteresis a small coreless coil or solenoid 25 through which a current of constant characteristics flows (Fig. 3). This arrangement, although theoretically improved with reference to that which has been disclosed precedingly by reason of the linearity of the graph giving out the weights versus electromotive forces shows on the other hand the drawback of requiring an excellent stabilization of the current flowing through the solenoid and this makes the instrument according to Fig. 1 more advantageous in practice. The solenoid 25 may also be fed by current from the equilibrating coil 7 located outside the chamber 21.

In this latter case, as also in the case in which an iron core 18 is used, the scale of variations in weight versus electromotive forces is a parabola.

On the other hand, of course, the different parts such as the screen, the tare, the iron core, the sample undergoing examination, may be positioned in any relative sequence at either end of the beam.

As concerns the damping of the scales, it is performed magnetically and to this end a damping current, which is proportional to the speed at which the screen 2 is shifted, i. e. to the derivative with reference to time of the current from the photo-cell 5, is sent into the magnetic attractive coil 7 and is thus superposed over the equilibrating current. One of the simplest methods for obtaining this damping current consists in coupling the circuit from the cell 5 or one of the amplifying tubes 22 controlled thereby with the grid of the last amplifier tube 23 of the electronic section of the instrument through the agency of a condenser 24 (Fig. 4).

This manner of damping the scales is obviously given solely by way of example and by no means in a limiting sense. As a matter of fact, it is possible to execute a separate damping by means of a second coil controlled in the same manner as the equilibrating coil 7 by the photo-cell 5 or else by another photo-cell controlled by another screen. Such a second coil may act on the iron core 18 or on another core.

The arrangements forming the object of the present invention are obviously applicable to scales and balances other than laboratory scales.

The principle underlying our invention allows recording any weights or modifications in weight. It may be applied in particular to weighbridges so as to provide for the recording at a rapid rhythm of the cars or carriages running in succession over the table of the bridge.

What we claim is:

1. A weighing instrument comprising scales, including a pivoting beam, means for operatively applying to said beam a weight to be measured, a screen and a magnetically sensitive member devoid of magnetic inertia, operatively engaging the beam and equilibrating the weight, adjustable means adapted to locate the center of gravity of the beam and associated parts: the weight-applying means, the screen and the magnetically sensitive member, on the pivotal axis of the beam, an electric circuit, a magnetizing equilibrating coil in said circuit, surrounding the magnetically sensitive member and adapted to produce a constant force along at least part of the length of its axis to exert on the said member an attraction which is an exclusive function of the current intensity flowing through the coil and modifies the angular setting of the beam, a photo-cell registering with a predetermined location of the screen, an amplifying circuit operatively connecting said photo-cell with the coil-feeding circuit, means producing a beam of light directed towards the photo-cell and cut off from the latter by the screen to an extent depending on the momentary location of the screen with reference to the photo-cell and means for registering the intensity of the current flowing through the coil feeding circuit.

2. A weighing instrument comprising scales, including a pivoting beam, means for operatively applying to said beam a weight to be measured, a screen and a magnetically sensitive member devoid of magnetic inertia operatively carried by the beam and equilibrating the weight, adjustable means adapted to locate the center of gravity of the beam and associated parts: the weigh-applying means, the screen and the magnetically sensitive member, on the pivotal axis of the beam, an electric circuit, a magnetizing equilibrating coil of substantially frustoconical outline in said circuit, surrounding the magnetically sensitive member and adapted to produce a constant force over a substantial depth to exert on the said member an attraction which is an exclusive function of the current intensity flowing through the coil and modifies the angular setting of the beam, a photo-cell registering with a predetermined location of the screen, an amplifying circuit operatively connecting said photo-cell with the coil-feeding circuit, means producing a beam of light directed towards the photo-cell and cut off from the latter by the screen to an extent depending on the momentary location of the screen with reference to the photo-cell and means for registering the intensity of the current flowing through the coil-feeding circuit.

3. A weighing instrument comprising scales, including a pivoting beam, means for operatively applying to said beam a weight to be measured, a screen and a magnetically sensitive member operatively carried by the beam and equilibrating the weight, adjustable means adapted to locate the center of gravity of the beam and associated parts, the weight-applying means, the screen and the magnetically sensitive member, on the pivotal axis of the beam, an electric circuit, a magnetizing equilibrating coil in said circuit, surrounding the magnetically sensitive member, the mean position of said magnetically sensitive member logitudinally of the axis of the magnetizing coil registering with a section of the axis of said coil where the magnetic force exerted by the latter lies in the vicinity of an extremum value of the curve of forces versus intensities of coil-feeding currents, a photo-cell registering with a predetermined location of the screen, an amplifying circuit operatively connecting said photo-cell with the coil-feeding circuit to energize the coil and produce a weight-balancing force in the latter, means producing a beam of light directed towards the photo-cell and cut off from the latter by the screen to an extent depending on the momentary location of the screen with reference to the photo-cell and means for registering the modification in the current produced in the cell and flowing through the coil-feeding circuit, under the action of the shifting of the screen consequent to the modification in the weight applied to the beam.

4. A weighing instrument comprising scales, including a pivoting beam, means for operatively applying to said beam a weight to be measured, a screen and a magnetically sensitive member devoid of magnetic inertia operatively engaging the beam and equilibrating said weight, a small adjustable weight carried by the beam in vertical register with the axis of the beam and the shifting of which is adapted to locate the center of gravity of the beam and associated parts: the weight-applying means, the screen and the magnetically sensitive member, on the pivotal axis of the beam to produce an indifferent equilibrium of the movable parts in the absence of any magnetic field, an electric circuit, a magnetizing equilibrating coil in said circuit, surrounding the magnetically sensitive member and adapted to produce a constant force along at least part of its axis to exert on the said member an attraction which is an exclusive function of the current intensity flowing through the coil and modifies the angular setting of the beam, a photo-cell registering with a predetermined location of the screen, an amplifying circuit operatively connecting said photo-cell with the coil-feeding circuit, means producing a beam of light directed towards the photo-cell and cut off from the latter by the screen to an extent depending on the momentary location of the screen with reference to the photo-cell and means for registering the current intensity flowing through the coil-feeding circuit.

5. A weighing instrument comprising scales, including a pivoting beam, means for operatively applying to said beam a weight to be measured, a screen and a soft iron core devoid of magnetic inertia operatively engaging the beam and equilibrating the weight applied to the latter, a small adjustable weight the shifting of which is adapted to locate the center of gravity of the beam and associated parts: the weight-applying means, the screen and the soft iron core, on the pivotal axis of the beam, to produce an indifferent equilibrium of the movable parts in the absence of any magnetic field, an electric circuit, a magnetizing equilibrating coil in said circuit, surrounding the soft iron core and adapted to produce a constant force along at least part of the length of its axis to exert on the said core an attraction which is an exclusive function of the current intensity flowing through the coil and modifies the angular setting of the beam, a photo-cell registering with a predetermined location of the screen, an amplifying circuit operatively connecting said photo-cell with the coil-feeding circuit, means producing a beam of light directed towards the photo-cell and cut off from the latter by the screen to an extent depending on the momentary location of the screen with reference to the photo-cell and means for registering the current flowing through the coil-feeding circuit.

6. A weighing instrument comprising scales, including a pivoting beam, means for operatively applying to said beam a weight to be measured, a screen and a solenoid operatively engaging the beam and equilibrating the weight, a small adjustable weight adapted to locate the center of gravity of the beam and associated parts: the weight-applying means, the screen and the solenoid, on the pivotal axis of the beam, to produce an indifferent equilibrium of the movable parts in the absence of any magnetic field, an electric circuit, a magnetizing equilibrating coil in said circuit, surrounding the solenoid and adapted to produce a constant force over at least part of the length of its axis to exert on the said solenoid an attraction which is an exclusive function of the current intensity flowing through the coil, a photo-cell registering with a predetermined location of the screen, an amplifying circuit operatively connecting said photo-cell with the coil-feeding circuit, means producing a beam of light directed towards the photo-cell and cut off from the latter by the screen to an extent depending on the momentary location of the screen with reference to the photo-cell and means for registering the current flowing through the coil-feeding circuit.

7. A weighing instrument comprising scales, including a pivoting beam, means for operatively applying to said beam a weight to be measured, a screen and a solenoid operatively engaging the beam and equilibrating the weight, a small adjustable weight adapted to locate the center of gravity of the beam and associated parts: the weight-applying means, the screen and the solenoid, on the pivotal axis of the beam, to produce an indifferent equilibrium of the movable parts in the absence of any magnetic field, an electric circuit, a magnetizing equilibrating coil in said circuit, surrounding the solenoid and adapted to produce a constant force over at least part of the length of its axis to exert on the said solenoid an attraction which is an exclusive function of the current intensity flowing through the coil, means for feeding said solenoid with current from the magnetizing coil circuit, a photo-cell registering with a predetermined location of the screen, an amplfying circuit operatively connecting said photo-cell with the coil-feeding circuit, means producing a beam of light directed towards the photo-cell and cut off from the latter by the screen to an extent depending on the momentary location of the screen with reference to the photo-cell and means for registering the value of the current flowing through the coil-feeding circuit.

References Cited in the file of this patent

UNITED STATES PATENTS

| | | |
|---|---|---|
| 2,067,741 | Weckerly | Jan. 12, 1937 |
| 2,081,367 | Nicholson | May 25, 1937 |
| 2,360,751 | Ziebolz | Oct. 17, 1944 |
| 2,630,007 | Howe | Mar. 3, 1953 |